Dec. 24, 1940.  G. E. PELTON  2,226,347
INK FOUNTAIN TYPING MACHINE
Filed June 17, 1938   7 Sheets-Sheet 1
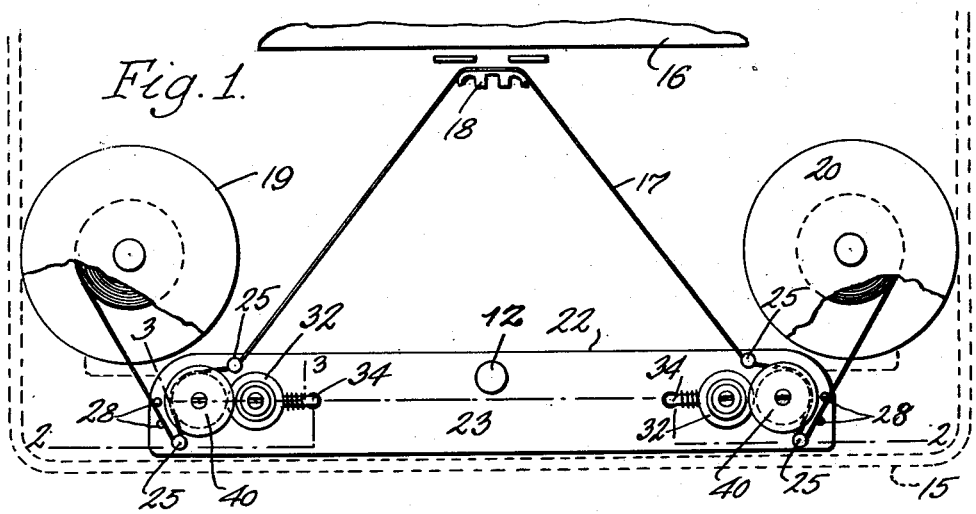
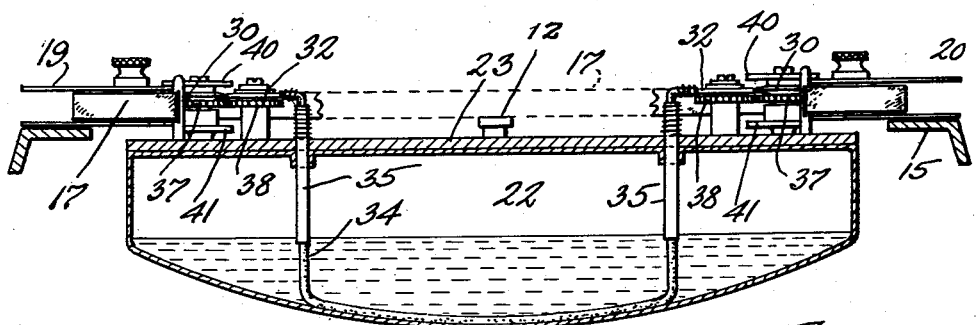
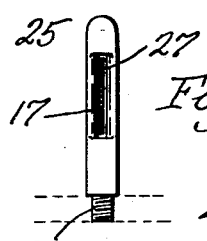
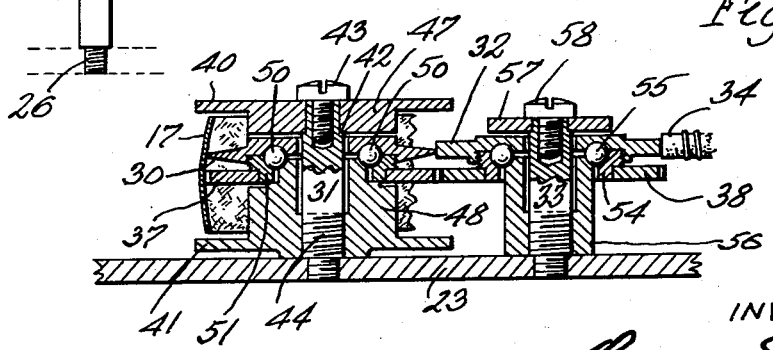
INVENTOR.
George E. Pelton.

Dec. 24, 1940.  G. E. PELTON  2,226,347
INK FOUNTAIN TYPING MACHINE
Filed June 17, 1938   7 Sheets-Sheet 2
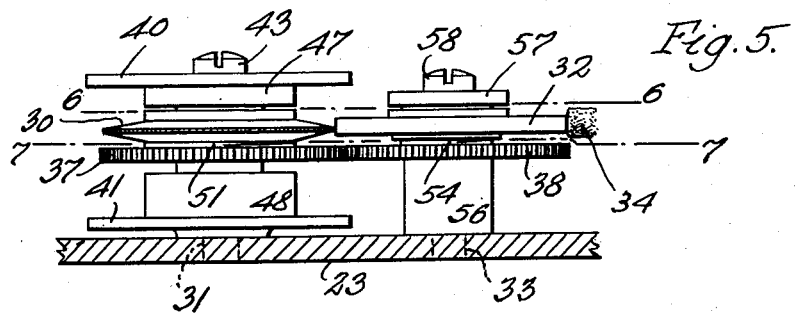
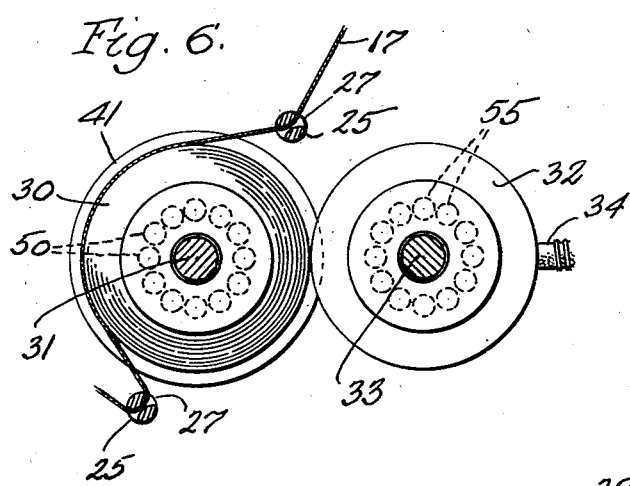
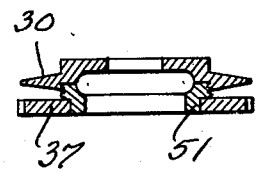
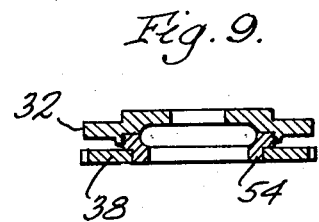
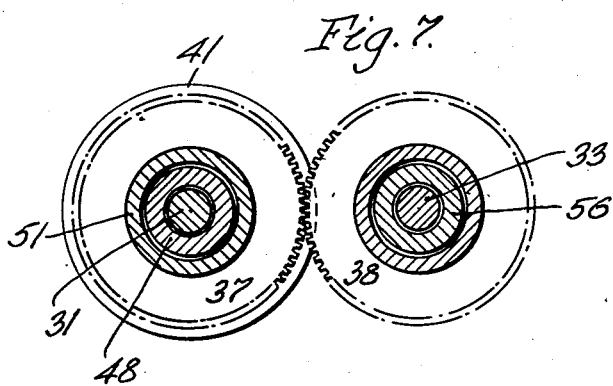
INVENTOR.
George E. Pelton Dec. 24, 1940.  G. E. PELTON  2,226,347
INK FOUNTAIN TYPING MACHINE
Filed June 17, 1938  7 Sheets-Sheet 3
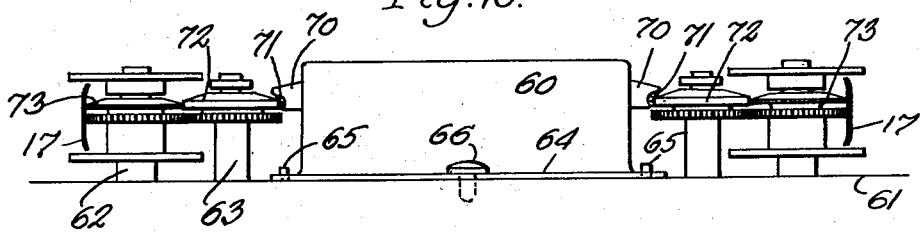
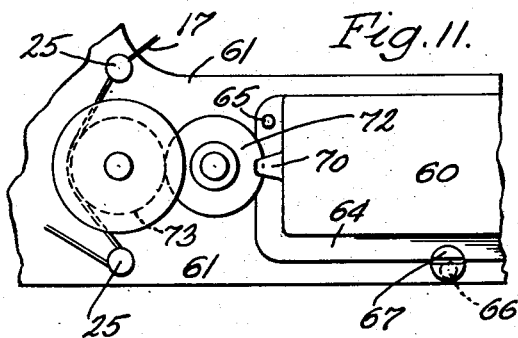
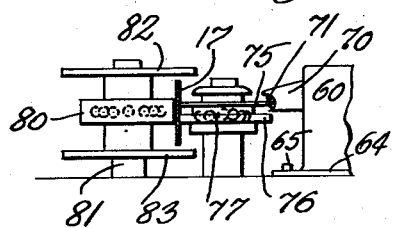
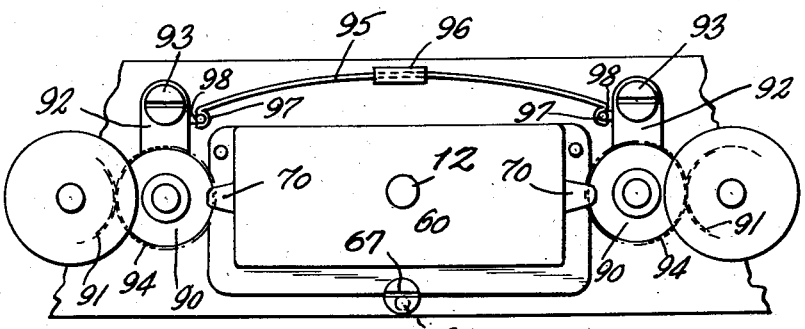
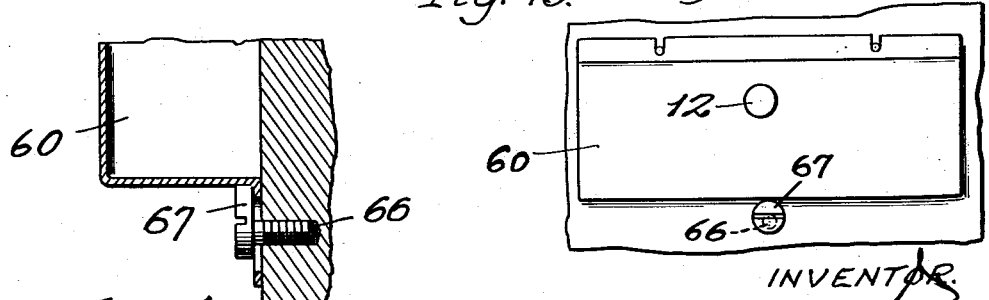
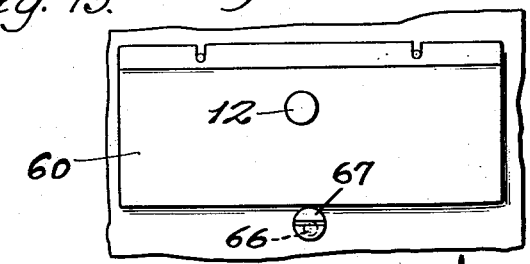

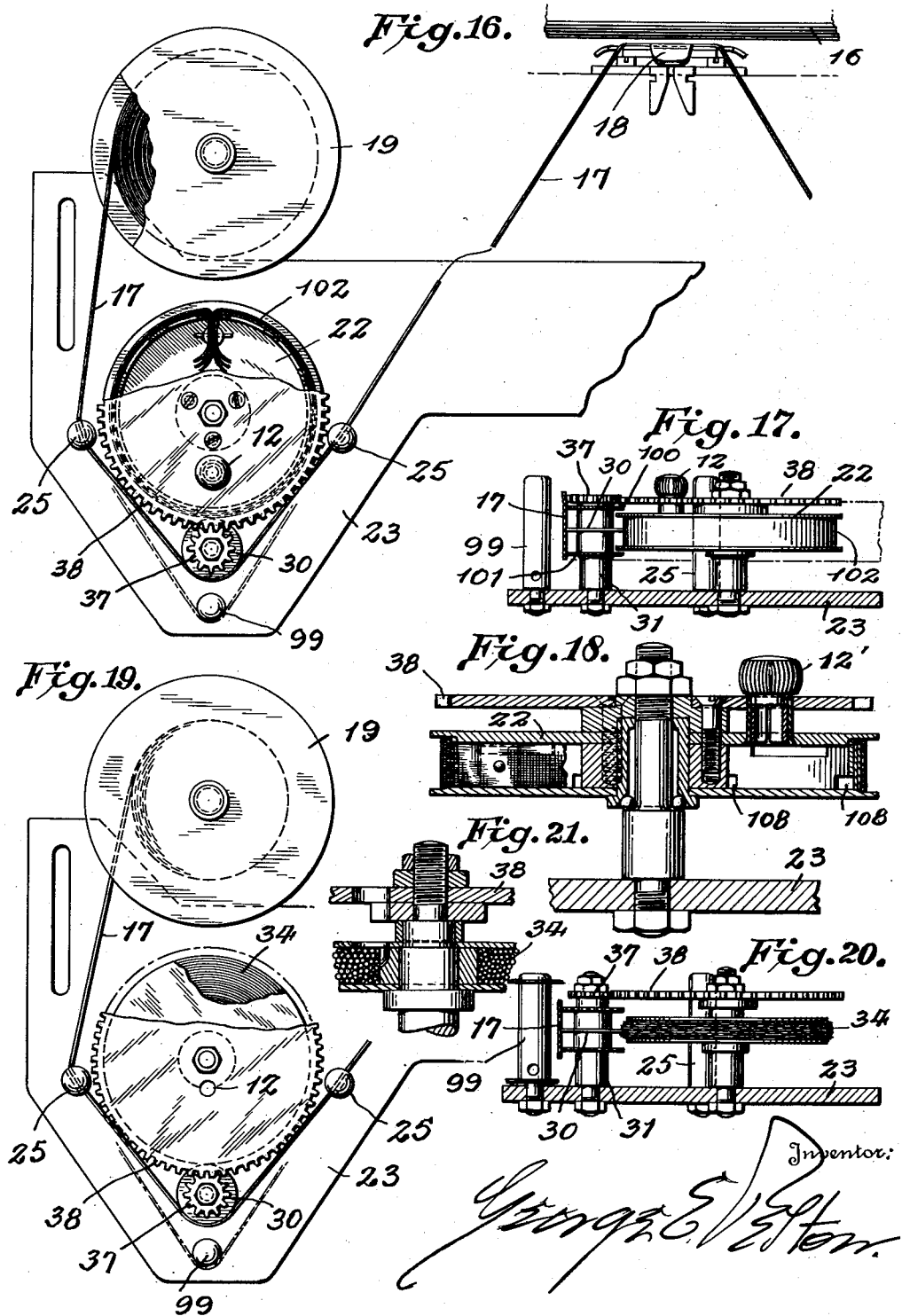

Dec. 24, 1940.    G. E. PELTON    2,226,347
INK FOUNTAIN TYPING MACHINE
Filed June 17, 1938    7 Sheets-Sheet 5
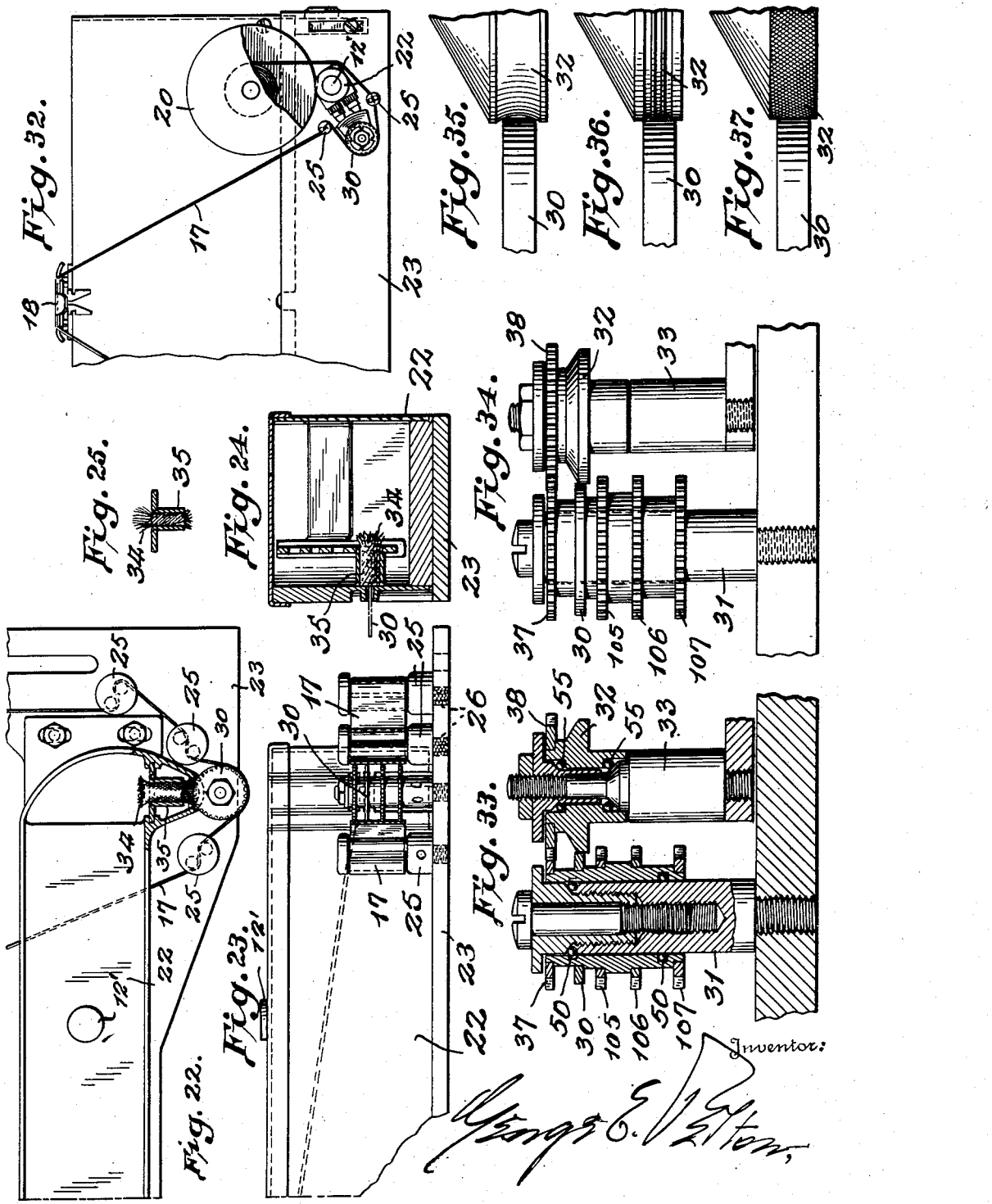

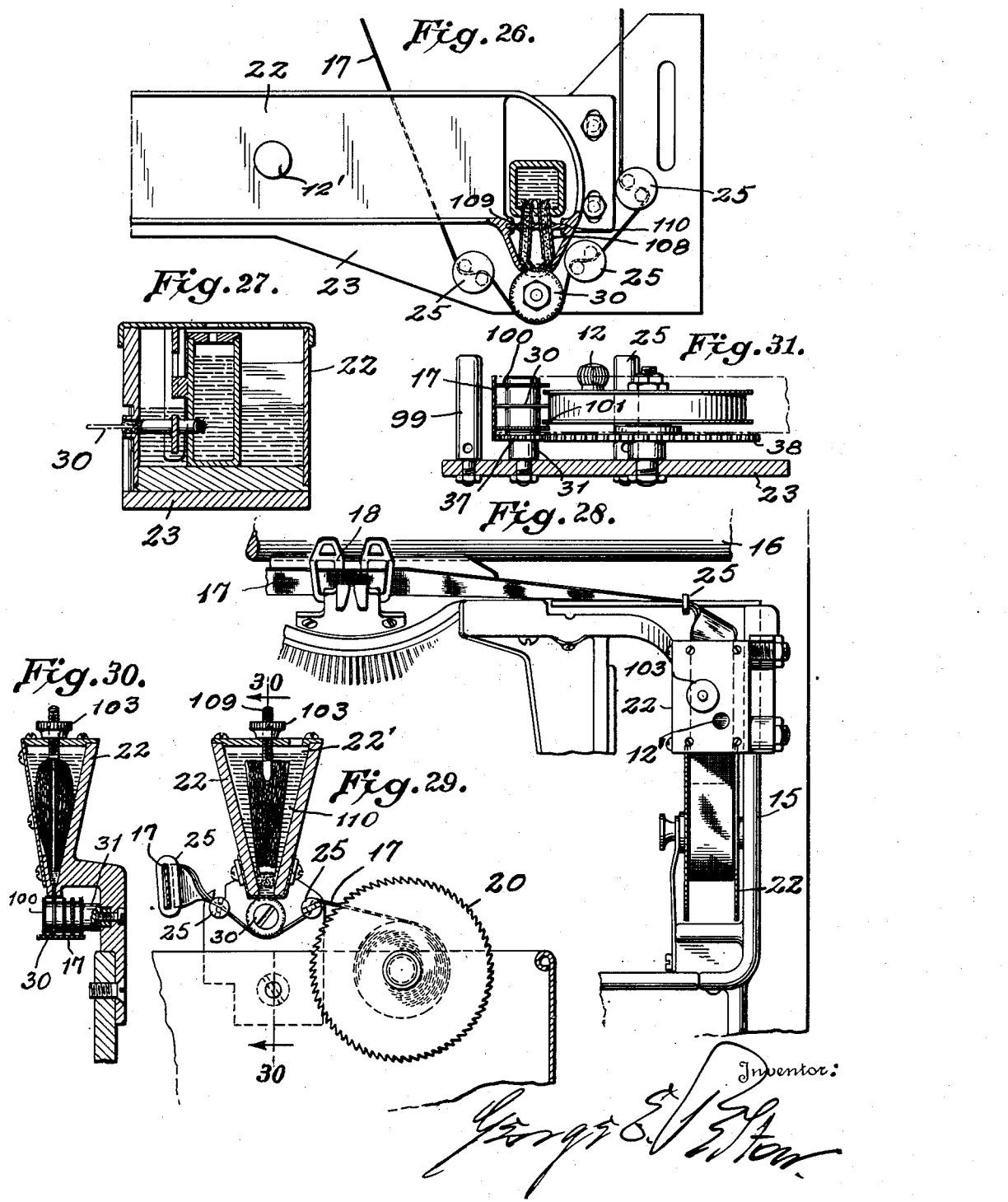

Dec. 24, 1940. G. E. PELTON 2,226,347
INK FOUNTAIN TYPING MACHINE
Filed June 17, 1938 7 Sheets-Sheet 7
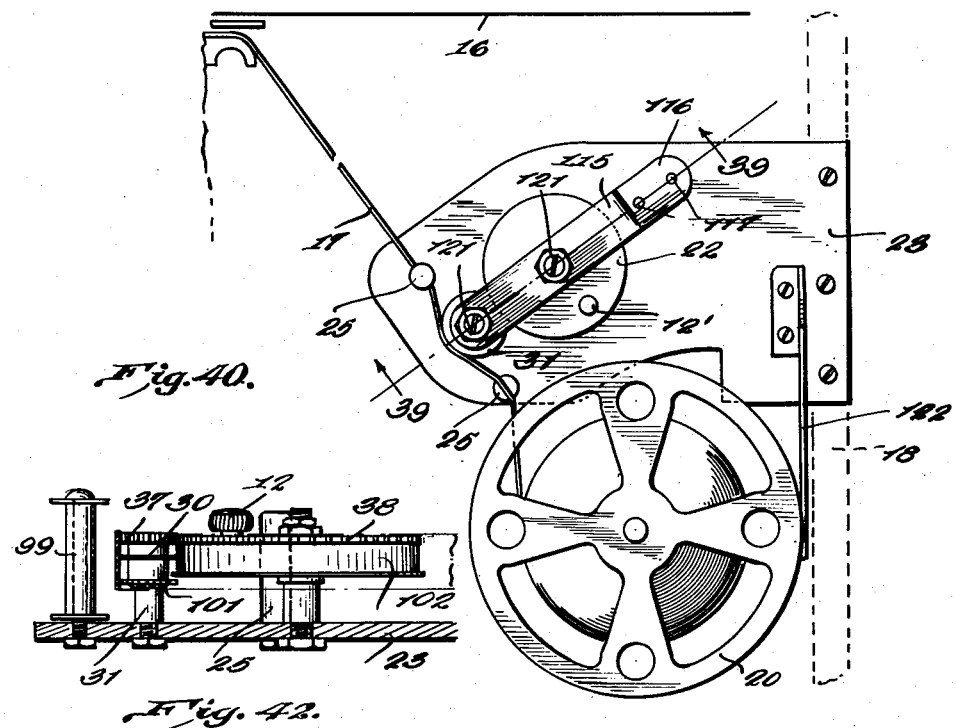
Fig. 40.
Fig. 42.
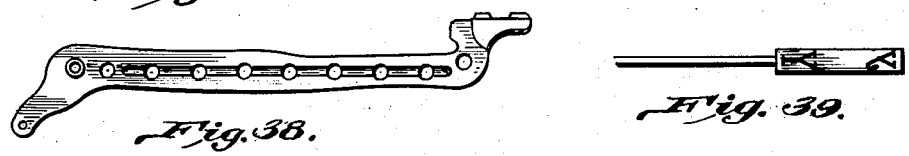
Fig. 38. Fig. 39.
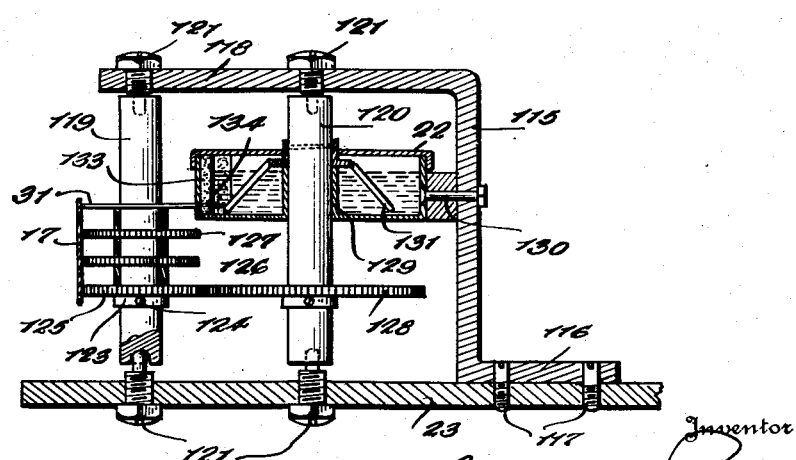
Fig. 41.
Inventor
George E. Pelton Patented Dec. 24, 1940

2,226,347

UNITED STATES PATENT OFFICE 2,226,347

INK FOUNTAIN TYPING MACHINE

George E. Pelton, Middleburg, Va.

Application June 17, 1938, Serial No. 214,335
In Canada November 4, 1937

6 Claims. (Cl. 197—171)

This invention relates to improvements in ink fountain typing machines and particularly to improvements in ink reservoirs and inking mechanisms of such machines.

One of the objects of this invention is to provide inking devices of an ink fountain typewriter in which the ink is fed by gravity upon one rotary member which lies directly below the reservoir of ink, said rotary member being the only rotary member of the inking device.

Another object of this invention is to provide an ink supplying device of fewer parts and less expensive to manufacture.

Another object of this invention is to provide an ink supplying device in which a gear used for imparting rotary motion to an ink carrying member also contacts with the inked ribbon to transmit power to the ink supplying device.

In some respects this invention is an improvement of the ink supplying device of my U. S. Patent 2,005,503 issued June 18, 1935.

Another object of the present invention is to provide an improved inking mechanism which may feed ink from time to time to the writing ribbon in such quantities as may be desired whether the ribbon is kept in contact with the inking disks at all times during operation of the typing machine or not. Or the typist may feed ink to the ribbon satisfactorily when the machine is idle.

Another object of the invention is to provide a gear and a rotary inking disk rigidly joined together and arranged coaxially and said gear acting as a driving member. Other objects will appear hereinafter from the following description and claims:

In the accompanying drawings:

Fig. 1 is a top plan view of an inking mechanism embodying one form of my invention and showing the same applied to a typing machine, only parts of which are shown.

Fig. 2 is a transverse sectional elevation, on line 2—2, Fig. 1.

Fig. 3 is a fragmentary sectional elevation thereof, on an enlarged scale, on line 3—3, Fig. 1.

Fig. 4 is an elevation of a ribbon guide member which may be used in connection with the ink supplying device.

Fig. 5 is an elevation of one of the ink supplying devices shown in Fig. 1, but on a larger scale.

Fig. 6 is a sectional plan view thereof, on line 6—6, Fig. 5.

Fig. 7 is a sectional plan view thereof, on line 7—7, Fig. 5.

Fig. 8 and Fig. 9 are sectional elevations of the revolving portions of the ink supplying device.

Fig. 10 is an elevation of an ink supplying device of modified construction.

Fig. 11 is a fragmentary top plan view thereof.

Fig. 12 is a side elevation of an ink supplying device of modified construction.

Fig. 13 is a top plan view of an ink supplying device of still another modified form.

Fig. 14 is a fragmentary view of a portion of the ink reservoir showing the screw that holds the reservoir in position.

Fig. 15 is a top plan view of one form of reservoir.

Fig. 16 is a top plan view of a portion of an ink fountain typing machine showing my invention in another form applied to a typing machine. Only parts of the typing machine are shown.

Fig. 17 is an elevation of an ink supplying device of modified construction.

Fig. 18 is a transverse sectional elevation of said device.

Fig. 19 is a top plan view of an inking device of modified form.

Fig. 20 is an elevation of an inking device of modified form.

Fig. 21 is a fragmentary sectional elevation enlarged.

Fig. 22 is a top plan view of an inking mechanism of modified form embodying my invention and showing the same applied to a typing machine, only part of which is shown.

Fig. 23 is an elevation of the inking device of Fig. 22.

Fig. 24 is a fragmentary sectional elevation thereof.

Fig. 25 is a fragmentary elevation illustrating wick used.

Fig. 26 is a top plan view of an inking mechanism of modified form showing two wicks for supplying ink to the inking disk.

Fig. 27 is a fragmentary, sectional elevation thereof.

Fig. 28 is a top plan view of an inking mechanism embodying my inventions and showing the same applied to a typing machine, only parts of which are shown.

Fig. 29 is a transverse sectional elevation thereof.

Fig. 30 is a fragmentary sectional elevation on line 30 Fig. 29.

Fig. 31 is similar to the inking mechanism of Fig. 17 but the gears are shown below instead of above.

Fig. 32 is a top plan view of an inking mechanism embodying my inventions and showing the same applied to a typing machine, only parts of which are shown.

Fig. 33 and Fig. 34 illustrate geared inking members.

Figs. 35, 36 and 37 illustrate respectively concave, grooved and pitted surfaces of inking members which contact with the inking disk which inks the typing ribbon or ink supplying ribbon of an ink fountain typing machine.

Fig. 38 is a plan view of an improved type-bar of special value when used with the present inking mechanisms.

Fig. 39 is a plan view of a modified form of type-block.

Fig. 40 is a top plan view of a further modification of the inking device,—only a portion of the typewriter being shown.

Fig. 41 is a cross section on the line 39—39 of Figure 40.

Fig. 42 is an elevation of a modification of the inking device of Fig. 17.

For the sake of brevity, the term "ink" is used hereinafter to designate any substance for making marks on a surface such as a pigment ink or a non-pigment ink.

The term "ribbon" is herein employed to designate any ink transfer ribbon to which ink may be supplied in a typing machine.

I have found that in order to secure the largest amount of neat writing of good color from one writing ribbon in a typing machine, it is advisable to use the simplest form of inking mechanism, with the fewest rotary parts which the ribbon turns and with very light weight type bars and light weight type blocks. Since the ribbon may be kept fully inked at all times during operation of the typing machine, it is no longer necessary to use heavy type-bars or heavy type-blocks. I also prefer to place the lower case letters on the extreme outer end of the type-bars and find that this gives less wear on the ribbon and gives lighter, quicker, speedier action for the typist in operating the machine.

I prefer to utilize a friction calendered, long fibre silk writing ribbon approximately .0025 to .003 of an inch in thickness and fill the spool with ribbon. The tension maintained on the ribbon at all times as it contacts with inking members on each side of the typing machine causes the ribbon to wind tightly and it does not bulge outside the spool after long use. Since the ribbon is advanced intermittently, or step by step, for each letter which is typed, it follows that during rapid writing the inertia of the parts which are moved by the ribbon becomes a factor in the proper inking of the ribbon. The fewer parts used for the inking devices and the easier these may be turned, the less the inertia to be overcome. If the inertia is relatively great and the mechanism for moving the ribbon back and forth through the typing machine (from one spool through the ribbon vibrator to the other spool) is weak, it is quite possible that the ribbon may slip relatively to the movable parts, while the inertia of the said parts is being overcome. Also frictional resistance of the movable parts may cause slippage of the ribbon with relation to the ink supplying device. These factors, therefore, may in some cases result in uneven inking of the ribbon. In accordance with the present inventions, I have provided an ink supply mechanism in which the parts are so constructed and arranged that the movable parts may be turned more easily at all times, in which the frictional resistance to the movement of these parts is also reduced, and, as illustrated in Figs. 22, 23, 26, 28, 29 and 30, I have provided inking devices of fewer rotary parts. Also in the inking devices illustrated in Figs. 1, 2, 3, 10, 16, 17, 18, 19, 20, and 31, improvements in design have been effected reducing friction.

In the construction shown in the various figures, I have illustrated my inventions as applied to an ordinary typing machine. Even the typing machine of Figs. 28, 29 and 30, is a common one.

In Figs. 1 and 2, 15 represents the frame of a typing machine having a platen 16, and 17 represents the writing ribbon which is guided into operative relation to the platen by means of a vibrator 18, of usual construction. 19 and 20 represent the ribbon spools which are actuated in the usual manner so that the ribbon is fed from one spool to another, back and forth in the typing machine. As shown in Figs. 1 and 2, the typing machine is provided with a pair of inking mechanisms, one being located adjacent each spool, it being understood, however, that only a single mechanism may be employed if desired. These inking devices may be arranged in any desired location and may be secured to the frame of the typing machine itself or to a new top plate which may be fastened to the frame with screws.

Since the two inking devices shown in Figs. 1 and 2 are identical, only one of them will be described.

In the particular construction illustrated in Figs. 1 to 9, the writing ribbon 17 is guided in any suitable manner, for example by means of a pair of slotted guide posts 25, each of which has a lower portion suitably fastened, for example, by means of a screw threaded part 26 engaging in a threaded aperture in the top plate 23 of the ink reservoir. These posts may be provided with upright guide slots 27 through which the typewriting ribbon passes. (See Fig. 4.) Other suitable guide means may be employed if desired.

As shown in Fig. 1, the top plate 23 of the ink reservoir may be provided with a plurality of threaded apertures 28 into any one of which the posts 25 may be secured. The guide posts 25 guide the ribbon into contact with the periphery of an inking disk 30 which may be of any suitable or desired construction and which is mounted to rotate about the axis of a post 31 which may also be secured to the top plate 23 of the ink reservoir 22. The periphery of the disk 30 may be supplied with ink in any suitable or desired manner, and in the construction shown for this purpose, the periphery of the disk 30 may be in rolling contact with the periphery of a disk 32 rotating about another post 33 which extends substantially parallel with the post 31. The disk 32 may receive ink in any suitable or desired manner, for example from a wick 34 which extends into the ink reservoir 22 through tube 35. When two inking devices are employed, a single wick may be used, as shown in Fig. 2, the ends of which extend into operative relation to the inking devices and the middle portion of which is submerged in the ink. I prefer to use wool fibres for the wick. These fibres are preferably in the form of wool yarn twisted. Inking disk 32 of Figs. 2, 3, 5, 9, 33, 34, 35, 36, 37, may be of any desired shape. It may be serrated or may have a solid periphery, or its surface may be smooth and straight, or concave as in Fig. 35 or grooved as in Fig. 36 or pitted as in Fig. 37.

Disks 30 and 32 may have gears rigidly secured to them in any desired manner, the disks so fastened to gears being shown in Figs. 3 and 5. The two gears mesh with each other so that disks 30 and 32 will rotate with their peripheries in contact with each other. The disk 30 consequently has a gear 37 rigidly secured thereto and a gear 38 is secured to disk 32, the gears being of such diameter as to mesh with each other. It will be noted too that, in accordance with the construction shown, the gear 37 is so located with reference to gear 38 that the teeth of the gear 37 will be engaged by the writing ribbon 17, whereas in constructions heretofore employed, the gears were arranged beyond an edge of the ribbon so as to be out of contact therewith. The construction herein described, however, has the two-fold advantage in that, in the first place, by arranging the gear 37 in close proximity to the disk 30, the two parts can be formed into a unit of comparatively little weight and inertia, and furthermore, the gear 37 by contacting with the ribbon 17 will act as a driving member which will insure a positive driving of the disk 30 in contact with the ribbon 17. (Ribbon 17 contacts with gear 37 of Figs. 33 and 34. Ribbon 17 also contacts with gear 37 Fig. 31.) In order to reduce the weight of the rotating parts, the means for guiding the ribbon into operative relation to the disk 30 is constructed in such a manner as not to be in driving connection with the disk 30 and the gear 37. For this purpose, there are provided on the post 31 a pair of flanged members 40 and 41, arranged to engage opposite edges of the ribbon, and the upper flanged member 40 may be secured against a shoulder 42 of the post 31 by means of a set screw 43, and the lower flange member 41 may be secured to the post 31 by means of a threaded portion 44 of the post. The two flanged members 40 and 41 may also be provided with inwardly extending spacing members 47 and 48 which confine the disk 30 and gear 37 in the desired relation to the ribbon, and one of these spacing members may serve as a part of the bearing for the disk 30 and gear 37.

Any suitable bearing may, of course, be employed to rotatably support the disk 30 and gear 37 on the upright post 31 and preferably a rolling bearing is provided for the purpose of reducing friction, the rolling bearing including balls 50 or other suitable rolling members. The ball bearings 50 may be held in place in any suitable or desired manner, and in the construction shown, the disk 30 is provided with a groove or ball race in which the balls are confined by means of a retaining ring 51 which may, for example, have a threaded engagement at its outer periphery with a correspondingly threaded portion of the disk 30. The gear 37 may be a part of or rigidly secured on this retaining ring 51. A corresponding ball race may be formed on the upper end of the spacing member 48 as indicated, to cooperate with the balls 50.

The disk 32 may be similarly connected to its gear 38 by means of a ring 54, a rolling bearing comprising, for example, balls 55 may be used, that shown being similar in construction to the one employed in connection with the disk 30 and gear 37. The post 38 may for this purpose be provided with an upwardly extending sleeve 56, the upper end of which cooperates with the bearing balls 55, and a disk 57 may be secured on the upper end of the post 33 by means of a set screw 58.

In Figs. 33 and 34, two race-ways are utilized to cause the rotary members to revolve with the least possible force.

By means of the construction described, it will be obvious that as ribbon 17 is advanced in contact with the disk 30 and gear 37, the gear 37 acts as a driving member which serves to positively rotate the disk 30 so that its peripheral speed is substantially identical with the speed of travel of the adjacent portion of the ribbon 17. The gear 37 also transmits rotary motion to gear 38 so that disk 32 will be positively driven in contact with the end of the wick or other ink supplying means 34, and will consequently supply a uniform quantity of ink to the periphery of the disk 30. In order to increase the driving force on the rotating parts of the inking mechanism, the peripheral portion of disk 30 is preferably knurled or roughened as indicated in Fig. 5. It is also desirable to have disk 30 contact with the periphery of disk 32 somewhat below the middle portion of the disk 32 so that ink removed from disk 32 by the periphery of disk 30 will be quickly replaced by other ink flowing downwardly from the upper portion of disk 32 as well as by fresh ink supplied from wick 34. In Figs. 2, 3, 5, 10, and 31, the gears 37 and 38 are placed below. They may be above as illustrated in Figs. 17, 20, 33 and 34.

It will be noted that in the present invention above described, the disks and gears are positively driven by contact of the ribbon both with the knurled surface of the disk 30 and with the gear 37, and since the guide flanges 40 and 41 are stationary, (or at least do not receive rotary motion from the rotating parts of the inking mechanism) the parts which are rotated by the ribbon are of very light weight and furthermore are journalled on a rolling bearing to reduce the friction to a minimum. Consequently, the rotating parts of the inking mechanism will be very readily rotated by the intermittent movement of the ribbon so that a continuous and uniform supply of ink to the ribbon is assured. If desired the inking disks may be as much as ⅛ of an inch thick in which case ribbon 17 may be inked by slowly revolving the spools by hand when the typing machine is idle. Or the ribbon 17 may be inked by such a thick disk during operation of the machine and when sufficient ink has been taken up by said ribbon, the ribbon may be slipped outside a rotatable upright member 99 of Figs. 16, 19, and 20. (Or the said upright member 99 of said Fig. 17 may be a rigid post.) Ribbon 17 will then be unable to receive ink from inking disk 30. The ribbon may be put back in contact with disk 30 when desired.

The fact that the outer diameter of gear 37 is slightly greater than the diameter of disk 30 does not interfere with the operation of the inking device, for the reason that the ribbon will readily bend or be deflected into contact with the periphery of the disk 30 because of the manner in which the same is drawn about the periphery of the disk and gear, for example, by means of the guide posts 25. It is, of course, highly desirable to apply tension to ribbon 17 and this is accomplished mainly by the guide posts 25 and by positioning one of these guide posts in one or another of the holes 27, the tension of the ribbon being regulated as may be necessary for the particular typing machine used. The application of unnecessary tension to the ribbon 17 is avoided by means of this invention. There should be sufficient tension to cause the writing ribbon to wind smooth and tight in the spools thus insuring ample space at all times in the spools for ribbon 17.

In Figs. 10 and 11 an inking mechanism is illustrated in which an ink reservoir of modified construction is employed, which may be secured on a frame member 61 of the typing machine. In this construction, the two posts 62 and 63 of each inking mechanism are secured to the frame 61 and the ink reservoir 60 is provided at its base with an outwardly extending flange 64. This flange may be provided with apertures which may fit over suitable pins 65 on the frame member 61 and at the front end of the frame member a threaded aperture is provided for a screw 66. The head of this screw is preferably in the form of cam plate 67 which extends over the front end of the flange 64 of the ink reservoir and it may touch the front wall of the ink reservoir as illustrated in Figure 15. By merely loosening the screw 66, the retaining cam member 67 may be turned out of engagement with the ink reservoir so that the same may be lifted out of its place and replaced by another reservoir which is full of fresh supply of ink. The side walls of the ink reservoir are provided with suitable tubular extensions 70, each of which contains a wick 71 (preferably of wool yarn or woven highly absorbent soft wool fibres) engaging the disk 72 of the inking mechanism which in turn supplies ink to disk 73 contacting with ribbon 17; the disks 72 and 73 corresponding respectively to the disks 32 and 30 employed in the construction shown in Fig. 1. Otherwise the inking devices of Fig. 10 and Fig. 11 are very similar to those which have already hereinabove described.

In Fig. 12, I have illustrated an inking mechanism cooperating with a reservoir 60 similar to that shown in Figs. 10 and 11, and in this case the wick 71 cooperates directly with disk 75 with which the ribbon 17 also contacts. The inking disk 75 preferably has rigidly secured thereto a driving member 76 which may, for example, be a gear or merely a disk with a knurled periphery which periphery also contacts with a face of ribbon 17 so as to insure proper rotation of the disk 75 at the same peripheral speed as the speed of travel of ribbon 17. The driving member 76 and disk 75 are preferably rotated about a post by means of a rolling bearing such as the ball bearing 77 indicated in broken lines in Fig. 12.

In order to provide for adequate contact of the ribbon 17 with the peripheries of disk 75 and driving member 76, a spacing roll or disk 80 is preferably provided which may be journalled on a post 81 in such manner that the ribbon 17 in passing through the space between the spacing roller 80 and the disk 75 and driving member 76, will be pressed against the peripheries of disk 75 and member 76, to insure a uniform deposit of ink from disk 75 to a face of ribbon 17 and also to press the ribbon 17 into contact with driving member 76 with sufficient power to insure rotation of the driving member 76 and disk 75. In this construction, the post 81 also supports guiding flanges 82 and 83 which may respectively engage with the upper and lower edges of ribbon 17 to hold the same in correct relation to disk 75. These guiding flanges 82 and 83 may be stationary or may be rotatably journalled but are free from driving connection with disk 75 and its driving member 76, as it also the case with the guiding flanges or members 40 and 41 described in connection with Figures 1 to 9, inclusive.

In Fig. 13 is illustrated a construction similar to that shown in Figs. 10 and 11, except that the disks 90 which serve to carry ink from the wick to disks 91, with which the ribbon contacts, are mounted on upright posts. Each post is secured to an arm 92 mounted to swing about an upright pivot 93. The disk 90 and its driving member or gear 94 may be yieldingly pressed toward disk 91 and its driving member or gear in any suitable manner. In the construction illustrated in Fig. 13, I have shown a spring 95 secured at 96 to a fixed metal plate (or to a fixed part of a typing machine) and having ends 97 arranged pivotally to engage arms or projections 98 mounted on the pivoted arms 92 in such a manner that the spring 95 continuously urges the arms 92 yieldingly to swing away from each other.

In Fig. 14 the cam screw is illustrated which holds the reservoir securely in place.

In Fig. 15 a modified construction of ink reservoir 60 is illustrated showing the head of the screw 66 and showing a flange of the reservoir with two slots which engage two small pins to hold the reservoir securely in place.

In Fig. 16 and Fig. 17 are illustrated rotary inking members in which the ribbon 17 contacts with gear 37 and inking disk 30 and also with knurled members 100 and 101. Said knurled members together with gear 37 and inking disk 30 act as driving members in turning the rotary member 25 which contacts ribbon 17 and in turn rotate ink well 22. Directly above ink well 22 is gear 38 which meshes with gear 37 for rotation. Also disk 30 contacts with a fabric face 102 which forms the outer surface of ink well 22. As illustrated in Fig. 18, the revolving ink well 22 contains various openings 108 through which ink passes to keep the absorbent fabric 102 uniformly saturated with ink. Said fabric may be a loosely woven fabric which readily permits pigment ink to pass therethrough to the inking disk 30 which contacts with one face of said fabric 102.

In Figs. 19, 20 and 21, is illustrated a similar inking mechanism except that instead of a body of liquid ink being carried directly under large gear 38, I employ a wick member 34 which is saturated with ink. Ink is fed to the wick to replenish its supply by placing the spout of an oil can (but said can containing highly fluid non-pigment ink) into the aperture shown at 12 Fig. 19.

I do not limit myself to the particular relative positions of gears 37 and 38 with relation to spool 19 as shown in Figs. 16 and 19. I may place the small rotary member with its gear 37 between the ink well 22 and said spool 19, guiding the ribbon so it will properly contact with the small rotary member and with inking disk 30 of Figs. 17 and 20, being controlled by the position of guides 25. If desirable, gears 37 and 38 may be placed below. I prefer that a face of ribbon 17 contacts with gear 37 whether said gear is below disk 30 or above disk 30. Because gear 38 is several times as large as gear 37, the ink well 22 revolves very easily and this inking mechanism has the advantage that the ink well feeds pigment ink to the face of fabric 102 of Fig. 16 which in turn inks the disk 30 which inks ribbon 17. There is the additional advantage that the ink well is small and requires little space and the machine may be placed upside down or in any position and ink cannot escape from the ink well or ink reservoir 22. Disk 30 is certain to receive ink from the fabric 102 at all times when the typing machine is being operated since the ink well is certain to rotate, thereby bringing a saturated fabric into constant contact with the disk 30. Fabric 102 revolves slowly with much time to renew ink.

The advantages of the ink disk 30 and driving gear 37 and knurled wheels 100 and 101 of Fig. 17 are apparent, since they all contact a face of ribbon 17 and insure a positive driving of disk 30, and also a positive rotation of the inked fabric 102. This results in uniform inking of a face of ribbon 17.

In Fig. 22, Fig. 23 and Fig. 32 is illustrated a single rotary member with its inking disk 30 and three gears located as follows with relation to disk 30: one gear above and two gears below said disk. These gears have small teeth as illustrated in Fig. 22 particularly but the teeth are not sharp enough to injure the fabric of the writing ribbon 17 which contacts with all three as well as with disk 30. In this inking mechanism, ink is supplied through a woven wick which may be of loose structure permitting pigment ink to travel therethrough to disk 30 of Fig. 22. In Fig. 24 disk 30 is shown in contact with wick 34. I do not limit myself as to the width of ribbon 17. I also do not limit myself as to the number of gears or inking disks employed in contact with said ribbon. In typing machines employing a ribbon as much as six or eight inches wide, it may be desirable to use twenty inking disks and as many thin gears for insuring that the movement of the ribbon will always rotate the inking disks. Or I may use an inked ribbon only one quarter of an inch in width and only use one or two gears or knurled wheels in contact with a face of said ribbon, or I may use one gear rigidly fastened to the inking disk. I do not limit myself as to the size or number of wicks which feed ink to the various inking disks. In Fig. 32, two wicks are employed for feeding ink to but one inking disk and a similar set-up is used on the opposite side of the typing machine. The wicks are not exposed to the air but are enclosed in adjustable tubes as shown in Fig. 32.

I also do not limit myself as to the shape of the surface of any of the inking disks employed in my inking mechanisms. I may use a disk having a concave periphery or a grooved periphery or a disk whose peripheral surface is pitted. See Figs. 35, 36, 37.

In Figs. 26 and 27, a modified form of inking mechanism is illustrated in which two wicks held in place in two tubes are employed. The two tubes are permanently and rigidly fastened to a metal plate 108 which fits snugly into the slots shown at 109 and 110. Metal plate 108 has a number of holes of substantial size which permit the ink to pass therethrough readily.

Fig. 31 illustrates an inking mechanism similar to the one already described on page 12 in the description of Figs. 16 and 17 but in Fig. 31 the gears 37 and 38 are shown below.

In Figs. 28 and 29 and 30, purposely left until after the Fig. 31 hereinabove mentioned, is illustrated a preferred form of inking mechanism for use in typing machines such as employ ribbon spools in the position shown in Fig. 29. Ribbon spool 20 illustrates the spool of a standard typewriter. In the machanism illustrated we have the great advantage of feeding pigment ink straight down to an inking disk 30 which lies directly below the ink fountain 22' which, in the present instance, is illustrated as of tapering formation, the apex of which is directed in a downward direction. At the bottom of the ink fountain is a small, narrow slot covered by a strong, woven edge, long fibre silk ribbon. Any suitable ribbon may be used or it may be dispensed with entirely. Any suitable fastening means may be employed for securing the narrow ribbon to the ink fountain and preferably this ribbon is full of perforations to permit pigment ink to freely pass therethrough to the periphery of inking disk 30. The fountain 22' includes a closure cap having a suitable vent and medially of the cap there is provided a threaded aperture in which a threaded stud 109 is engaged, receiving an adjusting nut 103. The lower end of the stud 109 has suspended therefrom in any suitable manner a wick 110, preferably of wool yarn which is loose and highly absorptive of ink. The wick may be suspended upon a light, metallic triangular shaped frame, the frame tapering in the direction of the discharge slot of the ink fountain. The metallic frame may be suspended from the stud 109. It will be apparent that with adjustment of the nut 103, in either an upward or downward direction, upon the stud that the wick 110 will be moved relatively to the discharge slot, thereby varying the flow of ink to the periphery of said inking disk 30. The discharge slot is filled with wool yarn or other suitable loose wick material through which pigment ink may pass. If it is desirable to utilize a non-pigment ink which is largely formed of suitable dyes and oils and oleic acid, then the slot may be filled with a piece of hard felt wick of such structure that pigment ink could not possibly pass therethrough to the silk ribbon which lies directly above the periphery of inking disk 30 and in contact with said periphery. The structure of the wick employed depends, therefore, upon the kind of ink used.

By the construction shown and described, it has been found in actual practice over a considerable period operating day and night writing with an automatic electric typewriter, writing the same group of words hundreds of thousands of times, that there is no seepage of the ink through the wick and through the silk ribbon to the inking disk when the typing machine is idle for a continued period. Upon the rotation of the disk 30, however, feeding ink to the moving typing machine ribbon, ample ink will be discharged upon the inking disk's periphery and consequently to said ribbon. The ink is composed of the same constituent elements which compose usual pigment typewriter ribbon ink such as is used for inking the usual commercial typewriter ribbons. It is a pigment ground in oil. I prefer to use more oleic acid in the ink than is ordinarily employed. For writing telegrams with very large type such as employed in tele-type machines, I use a thinner ink than for fine correspondence work with elite or micro type.

It will be obvious with a machine equipped with my inventions it will not be necessary to pound ink out of a typing ribbon that is dry. Therefore heavy type-bars and heavy type blocks are no longer required in typing machines in order to get neat impressions. By using carbon paper such as has been developed to a high state of quality for use in noiseless typewriters, it is possible to secure a large number of legible carbon copies from new type-bar structures and new type blocks that are light and which do not brutally abuse the ribbon fabric. It is common knowledge that typists generally use medium inked or heavily inked ribbons and within a short time (possibly a week or ten days) the ink has been used to such an extent that heavy type-bars and heavy type-blocks seem a necessity in order for the typist to pound out of the threads of the ribbon fabric sufficient ink for a strong impression that is easily legible. Soon the writing becomes of gray color and the typist must pound still harder to get ink out.

The present invention contemplates a new era for the typist greatly increasing her comfort and efficiency and giving a vastly increased quantity of writing that substantially matches if the typist wishes ink fed constantly whenever the machine is in operation. The present invention contemplates the use of platens that are not noisy and are not hard; also the use of friction calendered long fibre silk writing ribbons. Such ribbons are approximately .005 of an inch thick when first woven and are then processed, without in the slightest degree injuring their wearing qualities in a typing machine and are reduced to approximately .003 of an inch in thickness, enabling the typist to have much less obstruction between the type and the writing paper or other writing surface and thereby making it possible to have extremely neat, fine writing at all times for correspondence or legal papers, etc. Since with my inventions the long fibre silk ribbon does not have to be capable of holding a large reserve supply of ink, and since I feed ink to the ribbon during its use, it is possible to maintain the thin ribbon fully saturated with ink at all times. Therefore, it is reasonable to utilize type-bars that are extremely light weight made of a metal that is an aluminum alloy stronger than steel. I have produced a complete set of such bars and they are highly efficient. The type-blocks need no longer be heavy but I employ type-blocks that are extremely light weight and I prefer to place all lower case letters at the extreme end of the type-bars and type-blocks. Careful tests disclose the important fact that when using the lower case letters in the usual position on the bar, it is very easy to secure a smeared imprint when utilizing a very heavily inked long fibre silk ribbon which carries a large amount of surface ink, while with the very same ribbon, if the lower case letters are at the extreme end of the type-bar, the impression will be neat and of attractive appearance in every respect. This new arrangement and utilizing the light weight type-bars and type-blocks has another beneficial result. The typing machine is much easier to operate and has a snappier action that is very pleasing to typists who have used the new type-bars with the lower case letters at the ends.

If desired, the type-bar may be made very thin as compared to all standard type-bars now in general use, and, as shown, it may be provided with a series of perforations extending transversely thereof, longitudinally, throughout its length. These apertures may vary in diameter in accordance with the taper of the type-bar.

The modified type of type-bar shown in Fig. 38 illustrates a type-bar formed of duraluminum but in this instance the type-bar embodies a longitudinal reinforcing rib. In this instance also, the bar is provided with a series of perforations extending throughout the longitudinal length of the type-bar. In this instance the apertures are the same size.

The modified type of block shown at the end of the bar in Fig. 38 and in Fig. 39 may be formed extremely small and light to insure a less brutal attack upon the ribbon's fabric and preferably the lower case letters are at the outer end of the block thus insuring neater impressions, lighter action for the typist and much more efficient use of the virtue of the fabric of the ribbon.

For correspondence uses, I prefer to have the type outlines thin at the outer portion similar to present type faces of the better standard correspondence and secretarial typewriters, but I much prefer a dull edge in preference to the sharp, cutting edges of the type which seems to be the present-day standard in general use on such typewriters. For billing work and for the telegraph typewriters called tele-type machines, I prefer to use a broader faced type with the edges rounded off. For the tele-type machines it is usual to employ heavy type-bars with heavy type-blocks and just one character on the type-block and this character is placed usually where lower case letters are commonly placed. I prefer to use a very light, ribbed type-bar with a very light weight type-block and use the large gothic letter out at the extreme end. In actual practice I have found this a big advantage. I have had operators in my employ running an electric typing machine, equipped with large telegraph type, day and night for several weeks and the advantages of the light type-bar and the light-weight block with the one character at the extreme outer end have been clearly shown. For tele-type machines I also prefer to use a very tightly woven, long fibre silk ribbon not more than about half standard width. Such a ribbon is materially wider than the height of the type of a tele-type machine and since with my present inventions, the ribbon may be kept saturated with ink at all times, there is no longer any necessity for using a wider ribbon. It is customary in typewriter factories to build all machines for half inch ribbons since some few of them are used with bi-chrome ribbons which do require the wide ribbon in order to have space for both colors.

In Figs. 40 and 41 I have illustrated a further modification of inking mechanism in which an agitator mechanism functions to supply ink to the rotating inking disk or wheel, and in order to understand the construction and operation of this form of the mechanism, attention is directed to these figures wherein there is shown a bracket 115 comprising a base 116 suitably apertured for screws 117 for mounting upon the base plate 23, the latter being carried upon the frame 18 of the typing machine. The bracket 115 also includes an arm 118 spaced vertically a suitable distance from the base plate 23 to rotatably mount a pair of upright shafts 119 and 120. The base plate 23 and the arm 118 each comprise adjustable spindle bearings 121 for rotatable support of the shafts 119 and 120.

The ribbon spool 20 will be suitably mounted in advance of the base plate 23, the ribbon 17 being guided through guide posts 25 as in the previous forms of the mechanism and in order to maintain sufficient tension upon the ribbon to hold it taut, I provide a resilient spring 122 anchored at one end to the base plate 23, the free end thereof bearing upon the periphery of the spool with sufficient force to prevent overrunning of the spool or spinning. The shaft 119 includes a sleeve 123 fixed thereto by a set screw 124 or otherwise, and this sleeve comprises a gear 125, a pair of friction disks 126—127 and the inking disk 31, each being suitably spaced vertically of the shaft and all being of the same diameters for all practical purposes, i. e. substantially the same diameters. As clearly shown in Fig. 41, the gear 125, friction disks 126—127 and the inking disk or wheel 31 contact the ribbon 17, and due to such engagement with said ribbon, the desired friction thus established will result in rotation of shaft 119, with movement of the ribbon 17. The shaft 120 has fixed thereto a gear 128 in mesh with the gear 125, and obviously with rotation of shaft 119, the shaft 120 will also be rotated.

Above gear 128 there is an ink reservoir 22, the latter including an axially upwardly extended sleeve 129 for freely receiving the shaft 120 therethrough,—the reservoir being rigidly secured to the bracket 115, as at 130. The sleeve 129 stops short of the top of the reservoir and forms a bearing seat for a rotatable agitator 131 rigidly fixed to shaft 120 for rotation therewith. The agitator 131, in the present instance, comprises a plurality of downwardly and outwardly diverging arms 132, adapted to agitate the ink within the reservoir and to distribute ink to a hard wool member 133 secured to that side of the reservoir adjacent the inking disk 31 but this member 133 has a plurality of small holes, amply large enough for pigment ink to pass freely therethrough. These are shown at 134. A circumferentially extended slot may be formed through the wool member 133 and the side wall of the reservoir 22 to admit the disk 31 therethrough, and from the foregoing it will be apparent that with rotation of the shaft 120, the agitator 131 will also be rotated, creating a thorough turbulence in the ink and mixing it all the time that the agitator is moving, insuring application of a well-mixed pigment or other ink to the periphery of inking disk or wheel 31.

In Fig. 42, which is a modified form of the inking mechanism shown in Fig. 17, the large gear 38 forms the upper wall of the ink reservoir. The ribbon 17 contacts with gear 37 and with inking disk or wheel 30 and with knurled rotary member 101. The rotatable member 99 of this figure is slightly different from the rigid post 99 of Fig. 17, being fitted with guide flanges at top and bottom of rotatable member 99 for guiding the ribbon when it is placed out of contact with the inking disk 30. The diameters of gear 37 and rotary members 30 and 101 may be about the same.

It will, of course, be readily understood that the reservoir 22 of Figs. 1 and 2 may be readily replenished with ink upon removal of cap 12 and the caps 12' of Figs. 23, 26, and 28 may similarly be removed and the ink replenished.

A variety of designs of inking mechanisms are illustrated for various types of typing machines since the present designs of standard adding machines, cash registers, teletype machines, and typewriters of various kinds necessitate a careful study of the available space and the most suitable shape for the inking device to be used for the best results. The design of inking mechanism of Fig. 28 was constructed especially to meet the requirements of a well known, standard electric typewriter manufactured in this country and a machine which is greatly benefited by the addition of the inking mechanism illustrated and described hereinabove.

It is apparent that by the use of my inventions, at low cost typing machines may operate for long periods and have only one ribbon which in some cases may be only ¼ inch in width thereby greatly diminishing first cost of fabric and also diminishing the weight of a full spool of ribbon in the machine.

While in the illustrations of my inking mechanisms, wicks are shown, it is to be understood that holes may be made through the wicks amply large enough for the free passage of pigment ink.

It is to be understood that the constructions shown are for purposes of illustration and variations may be made in sizes and styles of parts and in details without departing from the scope of the present inventions or from the spirit of said inventions. I do not limit myself as to the kinds of materials used in the wicks or ribbons, reservoirs or rotary members, or in any other parts. I do not limit myself as to the weaves of ribbons employed or as to their edging or structure or as to their inking. I prefer to use very narrow ribbons of black record pigment ink for letter writing and may use a dye and oil ink for teletype machines on work for newspaper offices and the like where the ink does not need to last for long years. I prefer to use long fibre silk ribbons with woven edges processed in accordance with the inventions of my U. S. Patent 1,830,559.

Having thus described my invention, what I claim is:

1. In a device for reinking ribbons of typing machines, a frame work, rotatable shafts supported thereby, a gear on each of said shafts in mesh with each other; a reservoir for ink fixed to said frame work and disposed axially of one of said shafts; an agitator on said shaft rotatable therewith and disposed within said reservoir; the wall of said reservoir having a slot; an inking disk on the other shaft and rotatable therewith, a portion of the periphery of said disk projecting through said slot; friction members of substantially the same diameter as said disk mounted on said other shaft; said friction members including one of said gears, and means for longitudinally moving said ribbon past the friction members and disk, and past the typing position in said machine.

2. In a typing machine equipped with an inked ribbon and means for moving same back and forth from spool to spool, and a mechanism coactive with said ribbon to make impressions, the combination of a reservoir for ink which must be agitated to render it fluid and which quickly coagulates and sets when left alone; a thin edged inking wheel; mixing means adapted to mix and agitate said ink to render it fluid; means for conjointly moving said inking wheel and mixing means; said means comprising a gear coaxial with said inking wheel, and another gear in mesh with said last mentioned gear and coaxial with said mixing means; an opening in said reservoir for the passage of mixed ink; means, including the said inking wheel, for removing ink from said opening and for transferring the same to a narrow, lengthwise portion of said ribbon's face; said ink being transferred from time to time during intermittent operation of said machine to renew said ribbon's ink supply; and the said opening in said reservoir being in its side wall.

3. In a typing machine equipped with a writing ribbon and means in said machine for moving the ribbon back and forth past the typing position from spool to spool, and a mechanism coactive with said ribbon to produce impressions, the combination of a reservoir adapted to contain pigment ink; an ink applying wheel having its periphery in contact with one face of said ribbon; a mixing means within said reservoir; driving means actuated by said ribbon for rotating said wheel and said mixing means; and means for feeding ink upon the periphery of said wheel in minute amounts for transfer to one face of said ribbon to renew its supply of ink.

4. In a device for inking a printing ribbon of a typing machine, comprising a frame work, rotatable shafts supported thereby, gears mounted on said shafts in mesh with each other; a reservoir for ink fixed to said frame work and disposed axially of one of said shafts; a plurality of downwardly and outwardly diverging members, driven by said one shaft and adapted to agitate the ink within said reservoir; the side wall of said reservoir having a slot; a wool fabric member adjacent said slot and rigidly fastened to said side wall; an inking disk mounted on the other shaft; the periphery of said disk projecting through said slot to contact said fabric member and to ink said ribbon; at least one friction member of approximately the same diameter as said disk and mounted on said other shaft for driving the same; and means for moving said ribbon back and forth past the typing position in said machine and in contact with said inking disk and said friction member.

5. In a device for reinking a ribbon of a typing machine, a frame work, rotatable shafts supported thereby, a gear on each of said shafts, said gears meshing; a reservoir adapted to contain ink fixed to said frame work and disposed axially of one of said shafts; a rotatable member inside said reservoir connected to said one shaft for mixing and agitating said ink; the side wall of said reservoir having a slot for passage of ink therethrough; an inking disk and friction members mounted on the other shaft, a portion of said disk contacting ink in said slot and transferring the same to a face of said ribbon; said friction members contacting a portion of one face of said ribbon; and said members being actuated by the movement of said ribbon; said machine being equipped with means for feeding said ribbon back and forth past the typing position and in contact with said inking disk and friction members.

6. In a device for inking a printing ribbon of a printing machine, said machine being equipped with spools and means for feeding said ribbon from spool to spool past the typing position and mechanism for producing inked impressions on a writing surface, a frame work, rotatable shafts supported thereby, gears mounted on said shafts in mesh with each other; a reservoir for ink fixed to said frame work and disposed axially of one of said shafts; means within said reservoir for agitating said ink during movement of said ribbon from spool to spool; an opening in the side wall of said reservoir for the passage of ink therethrough; an inking wheel contacting one face of said ribbon and mounted on the other shaft; said wheel being in position to pick up ink from said reservoir and transfer it in the form of a narrow film to one face of said ribbon; and means for driving said gears upon movement of the ribbon.

GEORGE E. PELTON.